Nov. 9, 1948. E. R. JACOBI 2,453,512
VEHICLE WHEEL
Filed Oct. 30, 1944
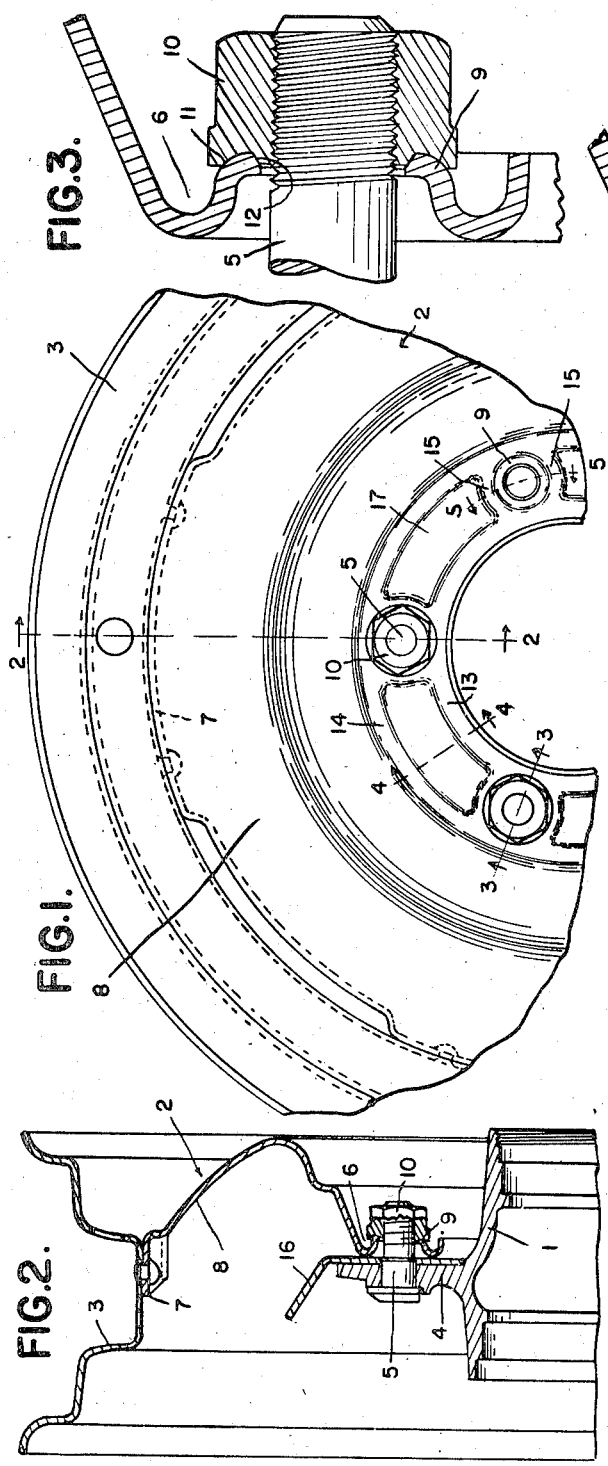
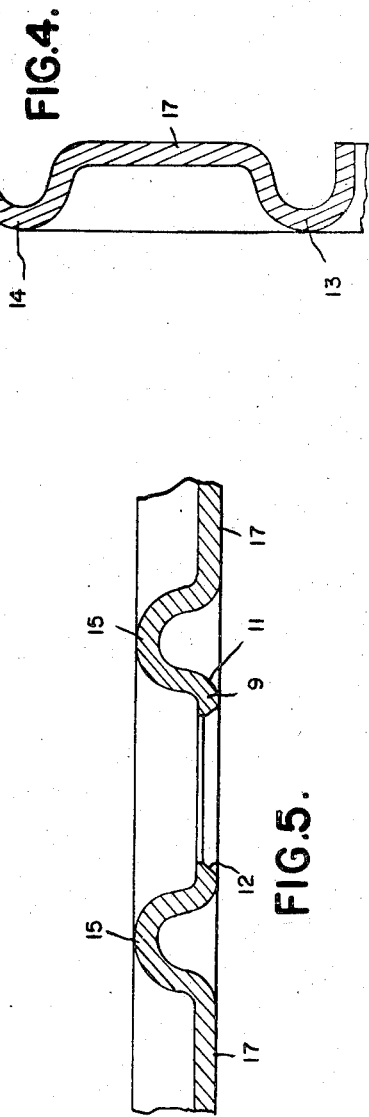
INVENTOR.
EMIL R. JACOBI
BY
ATTORNEYS Patented Nov. 9, 1948

2,453,512

UNITED STATES PATENT OFFICE 2,453,512

VEHICLE WHEEL

Emil R. Jacobi, Detroit, Mich., assignor to Kelsey-Hayes Wheel Company, Detroit, Mich., a corporation of Delaware Application October 30, 1944, Serial No. 560,972

3 Claims. (Cl. 301—9)

The invention relates to vehicle wheels and refers more particularly to vehicle wheels having pressed sheet metal wheel bodies.

The invention has for one of its objects to provide an improved construction of wheel whereby the wheel body may be effectively mounted on the wheel hub.

The invention has for another object to so construct the mounting portion of the wheel body that it is held substantially to shape by the nuts for securing the wheel body to the wheel hub.

The invention has for a further object to so construct the wheel body and the securing nuts that the portion of the wheel body engaged by the nuts is confined by the nuts and held from being split or spun.

These and other objects of the invention will become apparent from the following description, taken in connection with the accompanying drawings, in which Figure 1 is a side elevation of a portion of a vehicle wheel embodying the invention;

Figure 2 is a cross section on the line 2—2 of Figure 1;

Figures 3, 4 and 5 are cross sections on the lines 3—3, 4—4 and 5—5, respectively, of Figure 1.

The vehicle wheel embodying the invention comprises the wheel hub 1, the wheel body 2 and the tire carrying rim 3. The hub has the fixed radial flange 4 which is provided with the annular series of axially extending bolts 5 extending in an outboard direction. The wheel body is formed of pressed sheet metal and has the central generally radially extending mounting portion 6 for securement to the fixed flange 4, the radially outer peripheral portion 7 for securement to the base of the well of the rim 3, and the intermediate portion 8 connecting the mounting portion and the radially outer peripheral portion. The rim member, as shown, is of the drop-center type.

The mounting portion 6 of the wheel body is provided with the annular series of bosses 9 which extend in an outboard direction with each boss being provided at its outboard end with a hole registering with and receiving one of the bolts 5, the hole being of greater internal diameter than the external diameter of the bolt. 10 are clamping nuts threadedly engaging the bolts 5 and abutting the outboard ends of the bosses 9 for detachably securing the wheel body to the wheel hub.

For the purpose of preventing splitting and spinning of the bosses when tightening down the nuts, especially when the wheel body is of relatively light gauge, the bosses are formed at their outboard ends with the radially outer and inner inclined faces 11 and 12, respectively, which diverge with respect to each other in an inboard direction. Also the nuts are provided at their inboard ends with annular grooves providing inclined faces also diverging in an inboard direction. The diverging faces of the nuts engage the diverging faces of the bosses and confine the material at the outboard ends of the bosses so that it is held from being spun inwardly on the bolts and also held from expansion and consequent splitting. It will be further seen that the bosses provide for resiliency to assist in more effectively holding the nuts from accidental disengagement from the bolts.

To provide for more effectively mounting the wheel body on the wheel hub, the mounting portion 6 of the wheel body is provided with the radially spaced annular grooved portions 13 and 14 between which extend the annular series of arcuate grooved portions 15. The arcuate grooved portions connect integrally into the annular grooved portions and all of the grooved portions have substantially coplanar inboard faces for abutting the coplanar outboard face of the fixed flange 4 or of the web 16 of a brake drum, if such is secured to the outboard side of the fixed flange, as shown. The bosses 9 are located between the annular grooved portions and pairs of arcuate grooved portions and the arcuate bosses 17 which alternate with the bosses 9 preferably have flat faces at their outboard ends which are in the plane of the outboard end faces of the bosses 9. With this construction it will be noted that the mounting portion of the wheel body is effectively reinforced by reason of the annular and arcuate grooved portions so that the mounting portion is of substantial construction. At the same time the bosses provide for resiliency so that the clamping nuts are effectively secured in their clamping position.

What I claim as my invention is:

1. A vehicle wheel comprising a wheel hub having an annular series of axially extending bolts, a wheel body having an annular series of bosses extending in an outboard direction with each boss provided with a hole registering with and receiving one of said bolts and also provided with faces diverging in an inboard direction, and nuts threaded on said bolts for securing said wheel body on said wheel hub, said nuts engaging and confining said faces.

2. A vehicle wheel comprising a wheel hub having an annular series of axially extending bolts, a wheel body having an annular mounting portion provided with an annular series of bosses extending in an outboard direction with each boss provided at its outboard end with a hole registering with and receiving one of said bolts and also provided with inclined faces diverging in an inboard direction, and nuts threaded on said bolts for securing said wheel body on said wheel hub, each of said nuts having an annular groove, said nuts having their annular grooves engaging said inclined faces and confining the material at the outboard ends of said bosses.

3. A vehicle wheel comprising a wheel hub having an annular series of axially extending bolts, a wheel body having radially spaced annular grooved portions and an annular series of arcuate grooved portions extending between and connecting said annular grooved portions, said annular and arcuate grooved portions having substantially coplanar inboard faces, bosses between and connecting said grooved portions, each of said bosses being provided with a hole registering with and receiving one of said bolts and also provided with outboard faces diverging with respect to each other in an inboard direction, and nuts threaded on said bolts for securing said wheel body on said wheel hub, each of said nuts having an annular groove, said nuts having their annular grooves engaging said diverging faces and confining the material at the outboard ends of said bosses.

EMIL R. JACOBI.

REFERENCES CITED

The following references are of record in the file of this patent:

UNITED STATES PATENTS

| Number | Name | Date |
| --- | --- | --- |
| Re. 21,960 | Stough | Nov. 25, 1941 |
| 1,656,220 | Nelson | Jan. 17, 1928 |
| 1,666,722 | Tarbox | Apr. 17, 1928 |
| 1,974,746 | Kuhnen | Sept. 25, 1934 |
| 2,317,311 | Stough | Apr. 20, 1943 |